US012621548B2

(12) United States Patent (10) Patent No.: US 12,621,548 B2
Smirnov (45) Date of Patent: May 5, 2026

(54) CAMERA MODULE

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 205 days.

(21) Appl. No.: 18/402,162

(22) Filed: Jan. 2, 2024

(65) Prior Publication Data

US 2024/0323499 A1 Sep. 26, 2024

(30) Foreign Application Priority Data

Mar. 22, 2023 (KR) ........................ 10-2023-0037394

(51) Int. Cl.
*H04N 23/51* (2023.01)
*H04N 23/55* (2023.01)
*H04N 23/57* (2023.01)
(52) U.S. Cl.
CPC ............. *H04N 23/51* (2023.01); *H04N 23/55* (2023.01); *H04N 23/57* (2023.01)
(58) Field of Classification Search
CPC ......... H04N 23/51; H04N 23/55; H04N 23/57
See application file for complete search history.

(56) References Cited

U.S. PATENT DOCUMENTS

| | | | | |
|---|---|---|---|---|
| 2016/0299312 A1 | 10/2016 | Cho | | |
| 2018/0246293 A1* | 8/2018 | Lim | ......................... | G02B 7/09 |
| 2019/0294027 A1 | 9/2019 | Kim et al. | | |
| 2020/0348479 A1* | 11/2020 | Kwon | .................... | G03B 30/00 |
| 2023/0224585 A1* | 7/2023 | Sugawara | .............. | H04N 23/55 |
| | | | | 396/55 |

FOREIGN PATENT DOCUMENTS

| | | |
|---|---|---|
| JP | 2015-175879 A | 10/2015 |
| KR | 10-1518826 B1 | 5/2015 |
| KR | 10-2016-0120578 A | 10/2016 |
| KR | 10-1771439 B1 | 8/2017 |
| KR | 10-2017-0109193 A | 9/2017 |
| KR | 10-2019-0110412 A | 9/2019 |

OTHER PUBLICATIONS

Korean Office Action Issued on May 14, 2025, in Counterpart Korean Patent Application No. 10-2023-0037394 (5 Pages in English, 4 Pages in Korean).

* cited by examiner

*Primary Examiner* — Amy R Hsu
(74) *Attorney, Agent, or Firm* — NSIP Law

(57) ABSTRACT

A camera module includes a housing, and a carrier supported on the housing with a ball member therebetween, and movable in an optical axis direction. On opposite surfaces of the housing and the carrier facing each other in a direction perpendicular to the optical axis direction, a movement reduction portion having a corresponding shape is selectively disposed on the housing and the carrier.

17 Claims, 9 Drawing Sheets

1000

Z

X

Y

CAMERA MODULE

CROSS-REFERENCE TO RELATED APPLICATION(S)

This application claims the benefit under 35 USC 119(a) of Korean Patent Application No. 10-2023-0037394 filed on Mar. 22, 2023, in the Korean Intellectual Property Office, the entire disclosure of which is incorporated herein by reference for all purposes.

BACKGROUND

1. Field

The present disclosure relates to a camera module.

2. Description of the Background

Camera modules may be employed in mobile communication terminals such as smartphones, tablet PCs, laptop computers, and the like.

An autofocus function and an optical image stabilization function may be employed in such a camera module to generate a high-resolution image.

On the other hand, mobile communication terminals and camera modules may have had a structure in which lenses are moved in various directions to implement an autofocus function and an optical image stabilization function. In such cases there may be a problem in that foreign objects may be generated due to frictional contact between members facing each other according to such movement.

In addition, when adopting a ball member (ball bearing) to guide the movement of the lenses, there may be a problem in that the movement of a member may occur due to external impacts or the like, and thus generation of foreign objects may increase due to frictional contact between adjacent members.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, and a carrier supported on the housing with a ball member therebetween, and movable in an optical axis direction. On opposite surfaces of the housing and the carrier facing each other in a direction perpendicular to the optical axis direction, a movement reduction portion having a corresponding shape is selectively disposed on the housing and the carrier.

The movement reduction portion may include a protrusion and a retracting portion having a mutually corresponding shape and selectively disposed on the housing and the carrier.

The protrusion and the retracting portion may have a protrusion shape with a corner.

The protrusion and the retracting portion may have a round shape.

The protrusion and the retracting portion may be portions of a sphere.

Both the housing and the carrier may have substantially quadrangular cross sections, and the movement reduction portion may be disposed on all three surfaces other than facing opposite surfaces on which the carrier is supported by the housing.

The protrusion may protrude from the carrier in a direction toward the housing.

The protrusion may protrude from the housing in a direction toward the carrier.

The housing and the carrier may include a driving coil and a driving magnet, respectively, and the carrier may be supported on the housing by attractive force of a pulling yoke disposed in the housing and the driving magnet.

The camera module may further include a frame and a lens holder disposed in the carrier in the optical axis direction and movable in the optical axis direction together with the carrier.

The camera module may further include a first ball member disposed between the carrier and the frame, and a second ball member disposed between the frame and the lens holder.

The frame and the lens holder may be configured to move together in a first axis direction, perpendicular to the optical axis direction, and the lens holder may be configured to move in a second axis direction, perpendicular to the first axis direction, relative to the frame.

An electronic device may include the camera module.

In another general aspect, a camera module includes a housing having adjoining walls, and a carrier supported on the housing, and movable in an optical axis direction relative to the housing, wherein one or more walls of the adjoining walls includes inclined inner surfaces between adjacent walls, inclined relative to a virtual line between where the one or more walls intersect the adjacent walls, and wherein the carrier includes one or more surfaces facing the one or more walls, and having a shape corresponding to the inclined inner surfaces.

The camera module may further include a ball member disposed between the carrier and the housing.

The one or more walls may have one or more of a protrusion shape with a corner and a round shape.

Both the housing and the carrier may have substantially quadrangular cross sections, and the one or more walls may include three walls other than a wall of the adjoining walls on which the carrier is supported by the housing.

The inclined inner surfaces may protrude from the housing in a direction toward the carrier, or the shape corresponding to the inclined inner surfaces may protrude from the carrier in a direction toward the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
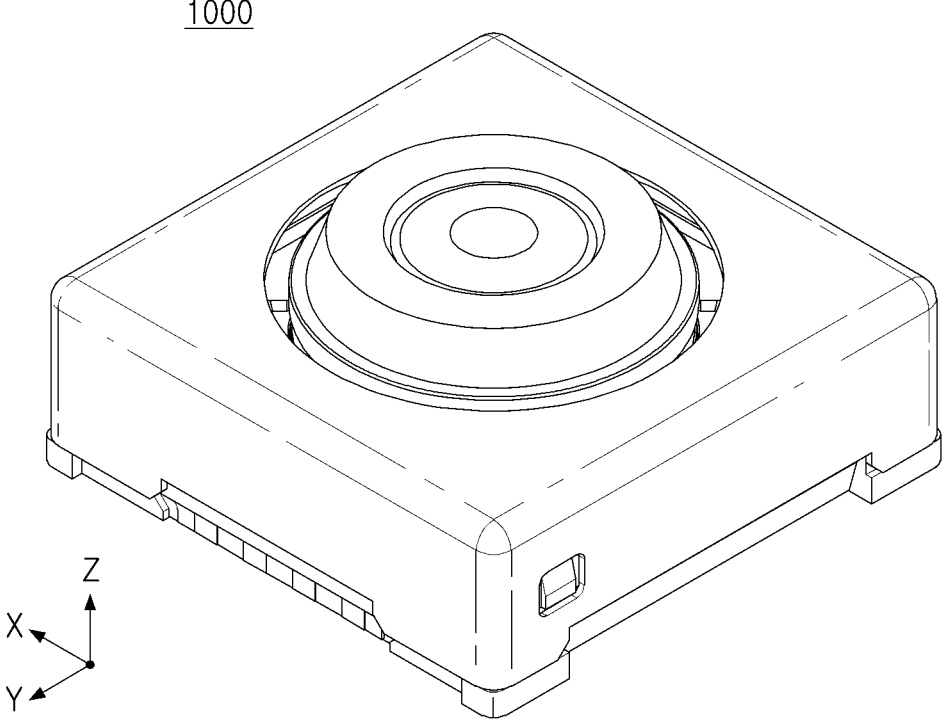
FIG. 1 is a perspective view of a camera module according to one or more example embodiments.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a camera module in which generation of foreign objects due to friction may be reduced while sufficiently maintaining functions of the camera module.

A camera module according to one or more embodiments may be provided, and may be applied to portable electronic devices such as mobile communication terminals, smartphones, and tablet PCs.

Figure 2:
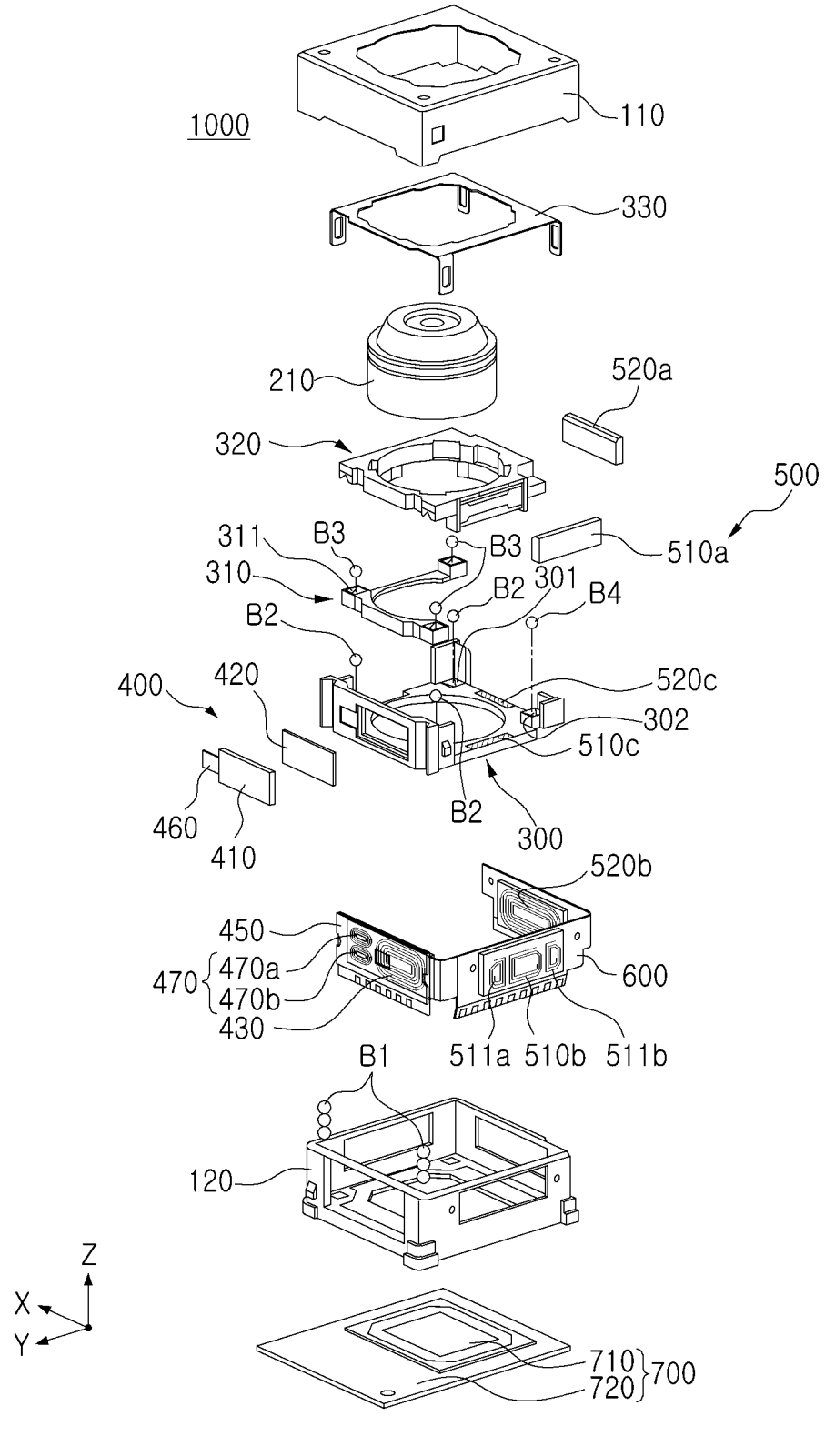
FIG. 2 is a schematic exploded perspective view of a camera module according to one or more example embodiments.

FIG. 1 is a perspective view of a camera module according to one or more example embodiments, and FIG. 2 is a schematic exploded perspective view of the camera module according to one or more example embodiments.

Referring to FIGS. 1 and 2, a camera module 1000 according to one or more example embodiments includes at least a housing 120 and a carrier 300 to enable autofocus driving. In addition, the camera module 1000 may further include a frame 310 and a lens holder 320 for moving a lens barrel 210 to enable optical image stabilization driving, in the carrier 300.

The camera module 1000 of these one or more embodiments may include the lens barrel 210, a lens driving device for moving the lens barrel 210, an image sensor module 700 converting light incident through the lens barrel 210 into an electrical signal, and the housing 120 and a case 110 accommodating the lens barrel 210 and the lens driving device.

The lens barrel 210 may have a hollow cylindrical shape in which a plurality of lenses for capturing an image of a subject may be accommodated, and the plurality of lenses are mounted in the lens barrel 210 along an optical axis.

The plurality of lenses are disposed in a predetermined number as required according to the design of the lens barrel 210, and respective lenses have optical properties such as the same or different refractive indices.

The lens driving device is a device that moves the lens barrel 210.

For example, the lens driving device may adjust the focus by moving the lens barrel 210 in the direction of the optical axis (Z-axis), and shaking during shooting may be corrected by moving the lens barrel 210 in a direction perpendicular to the optical axis (Z-axis).

The lens driving device includes a focus adjustment unit 400 adjusting focus and an optical image stabilization unit 500 correcting shake.

The image sensor module 700 is a device converting light incident through the lens barrel 210 into an electrical signal.

For example, the image sensor module 700 may include an image sensor 710 and a printed circuit board 720 connected to the image sensor 710, and may further include an infrared filter.

The infrared filter serves to block light in the infrared region among the light incident through the lens barrel 210.

The image sensor 710 converts light incident through the lens barrel 210 into an electrical signal. For example, the image sensor 710 may be a Charge Coupled Device (CCD) or a Complementary Metal-Oxide Semiconductor (CMOS).

The electrical signal converted by the image sensor 710 is output as an image through a display unit of a portable electronic device.

The image sensor 710 is fixed to the printed circuit board 720 and is electrically connected to the printed circuit board 720 by wire bonding.

The lens barrel 210 and the lens driving device are accommodated in the housing 120.

For example, the housing 120 has an open top and an open bottom, and the lens barrel 210 and the lens driving device are accommodated in the inner space of the housing 120.

The image sensor module 700 is disposed below the housing 120.

In addition, a substrate 600 providing driving signals to the focus adjustment unit 400 and the optical image stabilization unit 500 is disposed on the side surface of the housing 120. The substrate 600 may be provided as one substrate 600 surrounding the side of the housing 120.

As will be described later, in the sides of the housing 120, openings are provided such that a driving coil 430 and a first position detector 470 of the focus adjustment unit 400, and a first driving coil 510b, a second driving coil 520b, and a second position detector of the optical image stabilization unit 500 may be inserted.

The case 110 is combined with the housing 120 and serves to protect the internal components of the camera module 100.

In addition, the case 110 may function to shield electromagnetic waves.

For example, the case 110 may shield electromagnetic waves such that the electromagnetic waves generated by the camera module do not affect other electronic components in a portable electronic device.

In addition, since portable electronic devices are equipped with various electronic components in addition to the camera module, the case 110 may shield electromagnetic waves such that the electromagnetic waves generated by these electronic components do not affect the camera module.

The case 110 is formed of a metal material and may be grounded to a ground pad provided on the printed circuit board 720, thereby shielding electromagnetic waves.

Referring to FIG. 2, the focus adjustment unit 400 among lens driving devices of the camera module 1000 according to one or more example embodiments will be described.

To focus on a subject, the lens barrel 210 is moved by a lens driving device.

For example, according to one or more example embodiments, the focus adjustment unit 400 that moves the lens barrel 210 in the direction of the optical axis (Z-axis) is provided. The focus adjustment unit 400 includes at least the housing 120 and the carrier 300 driven in the optical axis direction inside the housing 120.

The focus adjustment unit 400 includes the carrier 300 accommodating the lens barrel 210, and a magnet 410 and a driving coil 430 generating driving force to move the lens barrel 210 and the carrier 300 in the direction of the optical axis (Z-axis).

The magnet 410 is mounted on the carrier 300. For example, the magnet 410 may be mounted on one surface of the carrier 300.

The driving coil 430 may be a copper foil pattern or a winding coil laminated and embedded in the substrate 600. The substrate 600 is mounted on the side of the housing 120 such that the magnet 410 and the driving coil 430 face each other in a direction perpendicular to the optical axis (Z-axis).

The magnet 410 is a moving member mounted on the carrier 300 and moving in the direction of the optical axis (Z-axis) together with the carrier 300, and the driving coil 430 is a fixed member fixed to the housing 120.

When power is applied to the driving coil 430, the carrier 300 may be moved in the direction of the optical axis (Z-axis) by the electromagnetic influence between the magnet 410 and the driving coil 430.

As illustrated in FIG. 2, since the frame 310 and the lens holder 320 are accommodated in the carrier 300 and the lens barrel 210 is mounted in the lens holder 320, the frame 310, the lens holder 320 and the lens barrel 210 are also moved in the direction of the optical axis (Z-axis) by the movement of the carrier 300.

When the carrier 300 is moved, a rolling member 1 (ball member) is disposed between the carrier 300 and the housing 120 to reduce friction between the carrier 300 and the housing 120. The rolling member 1 may be in the form of a ball.

The rolling member 1 is disposed on both sides of the magnet 410.

A first yoke 450 (pulling yoke) is disposed to face the magnet 410 in a direction perpendicular to the optical axis (Z-axis). For example, the first yoke 450 is mounted on an outer side surface (a surface opposite to the surface where the driving coil 430 is embedded) of the substrate 600. Therefore, the first yoke 450 is disposed to face the magnet 410 with the driving coil 430 interposed therebetween.

Attractive force between the first yoke 450 and the magnet 410 acts in a direction perpendicular to the optical axis (Z-axis).

Therefore, the rolling member 1 may maintain contact (supported) with the carrier 300 and the housing 120 by the attractive force between the first yoke 450 and the magnet 410.

In addition, the first yoke 450 also functions to focus the magnetic force of the magnet 410. Accordingly, leakage magnetic flux may be prevented from occurring.

For example, the first yoke 450 and the magnet 410 form a magnetic circuit.

On the other hand, a second yoke 420 may be disposed between the magnet 410 and the carrier 300. The second yoke 420 may function to focus the magnetic force of the magnet 410. Therefore, leakage magnetic flux may be prevented from occurring.

For example, the second yoke 420 and the magnet 410 form a magnetic circuit.

In one or more example embodiments of the present disclosure, a closed loop control method that detects and feeds back the position of the lens barrel 210 is used.

Therefore, the first position detector 470 is provided for closed loop control. The first position detector 470 includes a plurality of coils 470a and 470b and a control unit electrically connected to the plurality of coils 470a and 470b. Like the driving coil 430, the plurality of coils 470a and 470b may also have a copper foil pattern laminated and embedded in the substrate 600. In the embodiment of FIG. 2, two coils 470a and 470b are illustrated, but three or more coils may be provided.

The first position detector 470 is disposed to face a sensing yoke 460 disposed adjacently to the magnet 410. The sensing yoke 460 is mounted on one surface of the carrier 300, and the sensing yoke 460 may be a conductor or a magnetic material.

The first position detector 470 is disposed to face the sensing yoke 460 in a direction perpendicular to the optical axis (Z-axis). In addition, the first position detector 470 is disposed adjacent to the driving coil 430.

As the carrier 300 moves in the direction of the optical axis (Z-axis), the sensing yoke 460 mounted on the carrier 300 also moves in the direction of the optical axis (Z-axis). Accordingly, the inductance of the first position detector 470 is changed. The control unit may receive the inductance value from the first position detector 470 and detect the position of the lens barrel 210 (position in the optical axis (Z-axis) direction).

Accordingly, the position of the sensing yoke 460 may be detected from the change in inductance of the first position detector 470. The sensing yoke 460 is mounted on the carrier 300, the lens barrel 210 is accommodated in the carrier 300, and the carrier 300 moves in the direction of the optical axis (Z-axis) together with the lens barrel 210. As a result, the position of the lens barrel 210 (position in the optical axis (Z-axis) direction) may be detected from the inductance change of the first position detector 470.

The first position detector 470 may include a plurality of coils disposed in the optical axis (Z-axis) direction. For example, the first position detector 470 includes two coils 470a and 470b disposed in the optical axis (Z-axis) direction.

When the sensing yoke 460 moves in the direction of the optical axis (Z-axis), the position of the lens barrel 210 in the optical axis (Z-axis) direction may be more accurately detected by using the signal difference generated by the two coils 470a and 470b of the first position detector 470.

The inductance values of the two coils 470a and 470b may be changed not only by the relative position difference with the sensing yoke 460 but also by the temperature change of the surrounding environment, and the like.

However, in these one or more example embodiments, the exact position of the lens barrel 210 may be detected by removing factors such as temperature change in the surrounding environment.

For example, as the sensing yoke 460 moves, the increasing and decreasing directions of inductances of the two coils 470a and 470b may be different from each other. For example, when the inductance of one coil 470a increases, the inductance of the other coil 470b may decrease.

Therefore, when the inductance values of the two coils 470a and 470b are subtracted from each other, the factor caused by the temperature change in the surrounding environment may be removed, and accordingly, the position of the lens barrel 210 in the optical axis (Z-axis) direction may be accurately detected.

On the other hand, although the first position detector 470 is described as facing the sensing yoke 460 in these one or more example embodiments, the first position detector 470 may be disposed to face the magnet 410 without separately providing the sensing yoke 460.

Next, with reference to FIG. 2, the optical image stabilization unit 500 of the lens driving device of the camera module 1000 according to one or more example embodiments will be described.

The optical image stabilization unit 500 is used to correct blurring of an image or shaking of a video due to factors such as a user's hand-shake or the like when capturing an image or video.

For example, when shaking occurs during image capture due to a user's hand-shake or the like, the optical image stabilization unit 500 compensates for the hand-shake by providing a relative displacement corresponding to the hand-shake to the lens barrel 210.

For example, the optical image stabilization unit 500 corrects hand-shake by moving the lens barrel 210 in a direction perpendicular to the optical axis (Z-axis).

The optical image stabilization unit 500 includes a guide member for guiding the movement of the lens barrel 210, and a plurality of magnets and a plurality of coils for generating driving force to move the guide member in a direction perpendicular to the optical axis (Z-axis).

The plurality of magnets may include a first magnet 510a and a second magnet 520a, and the plurality of coils may include a first driving coil 510b and a second driving coil 520b.

The guide member includes a frame 310 and a lens holder 320. The frame 310 and the lens holder 320 are sequentially inserted into the carrier 300 in the optical axis (Z-axis) direction, and function to guide the movement of the lens barrel 210.

The frame 310 and the lens holder 320 have a space into which the lens barrel 210 may be inserted. The lens barrel 210 is inserted and fixed into the lens holder 320.

In these one or more example embodiments, even when a guide member for guiding the movement of the lens barrel 210 is used during optical image stabilization, the overall height of the camera module (height in the optical axis (Z-axis) direction) may be prevented from increasing.

For example, when viewed in the optical axis (Z-axis) direction, the frame 310 of the guide member may have a shape in which two sides of a quadrangle have been removed. Accordingly, the frame 310 may have ']' or 'L' shape when viewed in the direction of the optical axis (Z-axis).

The first magnet 510a and the second magnet 520a may be disposed in two open sides of the frame 310, respectively. Accordingly, the placement positions of the first magnet 510a and the second magnet 520a may not be affected by the frame 310, and accordingly, the overall height of the camera module may not increase.

The frame 310 and the lens holder 320 are moved in a direction perpendicular to the optical axis (Z-axis) with respect to the carrier 300 by driving force generated by a plurality of magnets and a plurality of coils.

The first magnet 510a and the first driving coil 510b generate driving force in the direction of the first axis (X-axis) perpendicular to the optical axis (Z-axis), and the second magnet 520a and the second driving coil 520b generates driving force in the direction of a second axis (Y-axis) perpendicular to the first axis (X-axis). For example, the plurality of magnets and the plurality of coils generate driving force in opposite directions.

In this case, the second axis (X-axis) refers to an axis perpendicular to both the optical axis (Z-axis) and the first axis (Y-axis).

A plurality of magnets are disposed to be orthogonal to each other in a plane perpendicular to the optical axis (Z-axis), and a plurality of coils are also disposed to be orthogonal to each other in a plane perpendicular to the optical axis (Z-axis).

The first magnet 510a and the second magnet 520a are mounted on the lens holder 320. For example, the first magnet 510a and the second magnet 520a are respectively mounted on a side surface of the lens holder 320. The side surface of the lens holder 320 includes a first surface and a second surface perpendicular to each other, and the first magnet 510a and the second magnet 520a are disposed on the first surface and the second surface of the lens holder 320.

The first driving coil 510b and the second driving coil 520b may be a copper foil pattern laminated and embedded in the substrate 600. The substrate 600 is mounted on the side of the housing 120 in such a manner that the first magnet 510a and the first driving coil 510b face each other in a direction perpendicular to the optical axis (Z-axis), and the second magnet 520a and the second driving coil 520b face each other in a direction perpendicular to the optical axis (Z-axis).

The first magnet 510a and the second magnet 520a are moving members that move in a direction perpendicular to the optical axis (Z-axis), together with the lens holder 320, and the first driving coil 510b and the second driving coil 520b are fixing members fixed to the housing 120.

On the other hand, in the present disclosure, a plurality of ball members supporting the frame 310 and the lens holder 320 of the optical image stabilization unit 500 are provided. The plurality of ball members serve to guide the movement of the frame 310, the lens holder 320, and the lens barrel 210 in the optical image stabilization process, and also function to maintain the distance between the carrier 300, the frame 310 and the lens holder 320.

The plurality of ball members include a first ball member B2 and a second ball member B3.

The first ball member B2 guides movement of the frame 310, the lens holder 320, and the lens barrel 210 in the first axis (X-axis) direction, and the second ball member B3 guides the movement of the lens holder 320 and the lens barrel 210 in the second axis (Y-axis) direction.

For example, the first ball member B2 rolls in the first axis (X-axis) direction when driving force is generated in the first axis (X-axis) direction. Accordingly, the first ball member B2 guides the movement of the frame 310, the lens holder 320, and the lens barrel 210 in the first axis (X-axis) direction.

In addition, the second ball member B3 rolls in the second axis (Y-axis) direction when driving force is generated in the second axis (Y-axis) direction. Accordingly, the second ball member B3 guides the movement of the lens holder 320 and the lens barrel 210 in the second axis (Y-axis) direction.

The first ball member B2 includes a plurality of ball members disposed between the carrier 300 and the frame 310, and the second ball member B3 includes a plurality of ball members disposed between the frame 310 and the lens holder 320.

A first guide groove 301 respectively accommodating the first ball member B2 is formed in the surface on which the carrier 300 and the frame 310 face each other in the direction of the optical axis (Z-axis). The first guide groove 301 includes a plurality of guide grooves corresponding to a plurality of ball members of the first ball member B2.

The first ball member B2 is accommodated in the first guide groove 301 and is interposed between the carrier 300 and the frame 310.

In a state in which the first ball member B2 is accommodated in the first guide groove 301, movement of the first ball member B2 in the optical axis (Z-axis) and second axis (Y-axis) directions is restricted, and movement of the first ball member B2 may only occur in the first axis (X-axis) direction. For example, the first ball member B2 may roll only in the first axis (X-axis) direction.

To this end, the planar shape of each of the plurality of guide grooves of the first guide groove 301 may be a rectangle having a length in the first axis (X-axis) direction.

A second guide groove 311 accommodating the second ball member B3 is respectively formed in the surface on which the frame 310 and the lens holder 320 face each other in the direction of the optical axis (Z-axis). The second guide groove 311 includes a plurality of guide grooves corresponding to a plurality of ball members of the second ball member B3.

The second ball member B3 is accommodated in the second guide groove 311 and is inserted between the frame 310 and the lens holder 320.

In a state in which the second ball member B3 is accommodated in the second guide groove 311, movement of the second ball member B3 in the optical axis (Z-axis) and first axis (X-axis) directions is limited, and the second ball member B3 may only move in the second axis (Y-axis) direction. For example, the second ball member B3 may roll only in the second axis (Y-axis) direction.

To this end, the planar shape of each of the plurality of guide grooves of the second guide groove 311 may be a rectangle having a length in the second axis (Y-axis) direction.

In one or more examples, a third ball member B4 disposed between the carrier 300 and the lens holder 320 is provided to support the movement of the lens holder 320.

The third ball member B4 supports the lens holder 320 moving in the first axis (X-axis) direction and the second axis (Y-axis) direction.

For example, the third ball member B4 rotates around the second axis (Y-axis) as a rotational axis when driving force is generated in the direction of the first axis (X-axis). Accordingly, the third ball member B4 does not interfere with the movement of the lens holder 320 in the first axis (X-axis) direction and may stably support the moving lens holder 320.

Further, the third ball member B4 rotates around the first axis (X-axis) as a rotational axis when driving force is generated in the direction of the second axis (Y-axis). Accordingly, the third ball member B4 does not interfere with the movement of the lens holder 320 in the second axis (Y-axis) direction and may stably support the moving lens holder 320.

In one or more examples, the second ball member B3 and the third ball member B4 contact and support the lens holder 320.

An accommodation groove 302 accommodating the third ball member B4 is formed on at least one of the surfaces of the carrier 300 and the lens holder 320 facing each other in the optical axis (Z-axis) direction.

The third ball member B4 is accommodated in the accommodation groove 302 and is inserted between the carrier 300 and the lens holder 320.

In a state in which the third ball member B4 is accommodated in the accommodation groove 302, movement of the third ball member B4 in the direction of the optical axis (Z-axis) is restricted, and the third ball member B4 may be rotated with the first axis (X-axis) and the second axis (Y-axis) as rotational axes.

To this end, the accommodation groove 302 may be concavely formed in a quadrangular pyramid shape. Therefore, the shape of the accommodation groove 302 and the shape of the first guide groove 301 and the second guide groove 311 are different from each other.

The first ball member B2 may roll only in the first axis (X-axis) direction, the second ball member B3 may roll only in the second axis (Y-axis) direction, and the third ball member B4 may be rotated with the first axis (X-axis) and the second axis (Y-axis) as rotational axes.

Therefore, the plurality of ball members supporting the optical image stabilization unit 500 of the present disclosure have a difference in degrees of freedom.

In this case, the degrees of freedom may indicate the number of independent variables required to represent the motion state of an object in a 3D coordinate system.

In general, the degree of freedom of an object in a three-dimensional coordinate system is six. The movement of an object may be expressed by a three-direction orthogonal coordinate system and a three-direction rotational coordinate system.

For example, in a 3D coordinate system, an object may perform a translational motion along each axis (X-axis, Y-axis, and Z-axis) and may perform a rotational motion based on each axis (X-axis, Y-axis, and Z-axis).

In this specification, the degree of freedom may refer to the number of independent variables required to represent the motions of the first ball member B2, the second ball member B3, and the third ball member B4, when power is applied to the optical image stabilization unit 500 and the optical image stabilization unit 500 is thus moved by driving force generated in a direction perpendicular to the optical axis (Z-axis).

For example, the third ball member B4 may be rotated with two axes (the first axis (X-axis) and the second axis (Y-axis)) as rotational axes by the driving force generated in the direction perpendicular to the optical axis (Z-axis), and the first ball member B2 and the second ball member B3 may roll along one axis (the first axis (X-axis) or the second axis (Y-axis)).

Therefore, the degree of freedom of the third ball member B4 and the degree of freedom of the first ball member B2 and the second ball member B3 are different.

When driving force is generated in the first axis (X-axis) direction, the frame 310, the lens holder 320, and the lens barrel 210 move together in the first axis (X-axis) direction.

In this case, the first ball member B2 rolls along the first axis (X-axis), and the 3rd ball member B4 rotates about the second axis (Y-axis) as a rotational axis. At this time, the movement of the second ball member B3 is limited.

In addition, when driving force is generated in the second axis (Y-axis) direction, the lens holder 320 and the lens barrel 210 move in the second axis (Y-axis) direction.

In this case, the second ball member B3 rolls along the second axis (Y-axis), and the third ball member B4 rotates about the first axis (X-axis) as a rotational axis. At this time, the movement of the first ball member B2 is limited.

On the other hand, in one or more examples of the present disclosure, a plurality of yokes 510c and 520c are provided such that the optical image stabilization unit 500 and the first to third ball members B2, B3, and B4 maintain a contact state.

The plurality of yokes 510c and 520c are fixed to the carrier 300 and are disposed to face the first magnet 510a and the second magnet 520a in the optical axis (Z-axis) direction.

Therefore, attractive force is generated between the plurality of yokes 510c and 520c and the first magnet 510a and the second magnet 520a in the direction of the optical axis (Z-axis).

Since the optical image stabilization unit 500 is pushed toward the plurality of yokes 510c and 520c by the attractive force between the plurality of yokes 510c and 520c and the first and second magnets 510a and 520a, the lens holder 320 and the frame 310 of the optical image stabilization unit 500 may maintain contact with the first to third ball members B2, B3, and B4.

The plurality of yokes 510c and 520c are formed of a material capable of generating attractive force between the first magnet 510a and the second magnet 520a. For example, the plurality of yokes 510c and 520c may be provided as a magnetic material.

In the present disclosure, the plurality of yokes 510c and 520c are provided so that the frame 310 and the lens holder 320 may maintain contact with the first to third ball members B2, B3 and B4, and a stopper 330 is provided to prevent the first to third ball members B2, B3, and B4, the frame 310, and the lens holder 320 from being separated from the outside of the carrier 300 by external impacts.

The stopper 330 is coupled to the carrier 300 to cover at least a portion of the upper surface of the lens holder 320.

In one or more example embodiments of the present disclosure, a closed-loop control method that detects and feeds back the position of the lens barrel 210 in the optical image stabilization process is used.

Thus, a second position detector for closed-loop control is provided. The second position detector is configured to detect the position of the lens barrel 210 in the first axis (X-axis) direction and the second axis (Y-axis) direction.

The second position detector includes a plurality of coils and a control unit electrically connected to the plurality of coils. The control unit may receive the inductance value from the plurality of coils and detect the position of the lens barrel 210 in the first axis (X-axis) direction and the second axis (Y-axis) direction.

Similar to the first driving coil 510b, the plurality of coils may also have a copper foil pattern laminated and embedded in the substrate 600.

The plurality of coils may be disposed on both sides of the first driving coil 510b or the second driving coil 520b. For example, when the plurality of coils include two coils, one coil may be disposed on both sides of the first driving coil 510*b* or the second driving coil 520*b*, respectively.

Hereinafter, for convenience of descriptions, it is described that a plurality of coils are disposed on both sides of the first driving coil 510*b*, but a plurality of coils may also be disposed on both sides of the second driving coil 520*b*.

The first magnet 510*a* is disposed to face the first driving coil 510*b* in the first axis (X-axis) direction. In addition, one side of the first magnet 510*a* is disposed to face a portion of any one of the plurality of coils of the second position detector, and the other side of the first magnet 510*a* is disposed to face a portion of another one of the plurality of coils of the second position detector.

In this case, the coil partially facing one side of the first magnet 510*a* is referred to as a 1-1 sensing coil 511*a*, and the coil partially facing the other side of the first magnet 510*a* is referred to as a 1-2 sensing coil 511*b*.

As the first magnet 510*a* moves in the first axis (X-axis) direction and/or the second axis (Y-axis) direction, the inductance of the plurality of coils of the second position detector changes.

Accordingly, the position of the first magnet 510*a* may be detected from the change in inductance of the plurality of coils. The first magnet 510*a* is mounted on the lens holder 320, the lens barrel 210 is mounted on the lens holder 320, and the lens holder 320 moves in the first axis (X-axis) direction and/or the second axis (Y-axis) direction together with the lens barrel 210. As a result, the position of the lens barrel 210 (position in the direction of the first axis (X-axis) and/or the second axis (Y-axis)) may be detected from the change in inductance of the plurality of coils of the second position detector.

A method of detecting a position of the lens barrel 210 in the first axis (X-axis) direction will be described.

When the lens barrel 210 is moved in the direction of the first axis (X-axis), the inductances of the 1-1 sensing coil 511*a* and the 1-2 sensing coil 511*b* may have the same increase/decrease direction.

Therefore, the second position detector of the camera module 1000 according to one or more example embodiments is configured to precisely detect the position of the lens barrel 210 in the first axis (X-axis) direction, by using any one of the inductance value of the 1-1 sensing coil 511*a* and the inductance value of the 1-2 sensing coil 511*b* based on the movement of the lens barrel 210, or by summing the two inductance values.

Next, a method of detecting the position of the lens barrel 210 in the second axis (Y-axis) direction will be described.

When the lens barrel 210 is moved in the second axis (Y-axis) direction, the inductances of the 1-1 sensing coil 511*a* and the 1-2 sensing coil 511*b* may have different increasing and decreasing directions.

Therefore, the second position detector of the camera module 1000 according to one or more example embodiments is configured to accurately detect the position of the lens barrel 210 in the second axis (Y-axis) direction, by subtracting the inductance value of the 1-1 sensing coil 511*a* and the inductance value of the 1-2 sensing coil 511*b* based on the movement of the lens barrel 210 from each other.

On the other hand, in a case in which an external shock or the like is applied to the camera module, the housing 120 and the carrier 300 may come into contact with each other and cause friction, and thus foreign objects may be generated inside the camera module. Also, this foreign objects may be further accelerated when the housing 120 and the carrier 300 come into surface contact. Accordingly, according to one or more example embodiments of the present disclosure, a structure in which surface contact between the housing 120 and the carrier 300 is significantly reduced and line contact or point contact is induced may be provided.

FIGS. 3A to 8 are cross-sectional plan views illustrating a coupled shape of a housing and a carrier of a camera module according to one or more various example embodiments.

In the camera module 1000 according to one or more example embodiments of the present disclosure, a movement reduction portion 350 may be provided on at least one surface of opposite surfaces of the housing 120 and the carrier 300 facing in the direction perpendicular to the optical axis direction.

In the camera module 1000 according to one or more example embodiments of the present disclosure, the movement reduction portion 350 may be a protrusion and a retracting portion selectively provided in the housing 120 and the carrier 300.

Figure 3A:
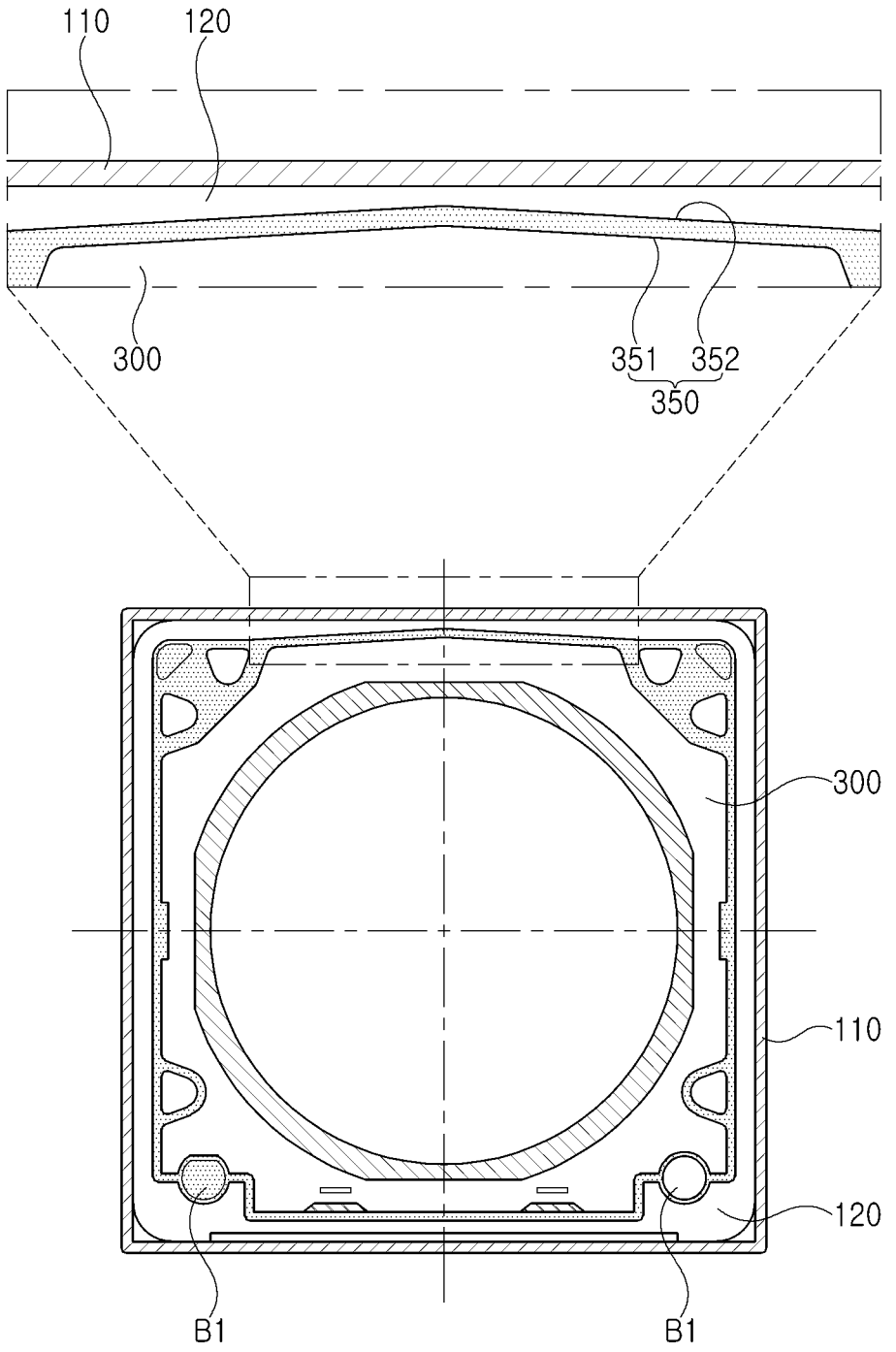
FIGS. 3A and 3B are cross-sectional plan views illustrating coupling shapes of a housing and a carrier of a camera module according to one or more various example embodiments.
Figure 7:
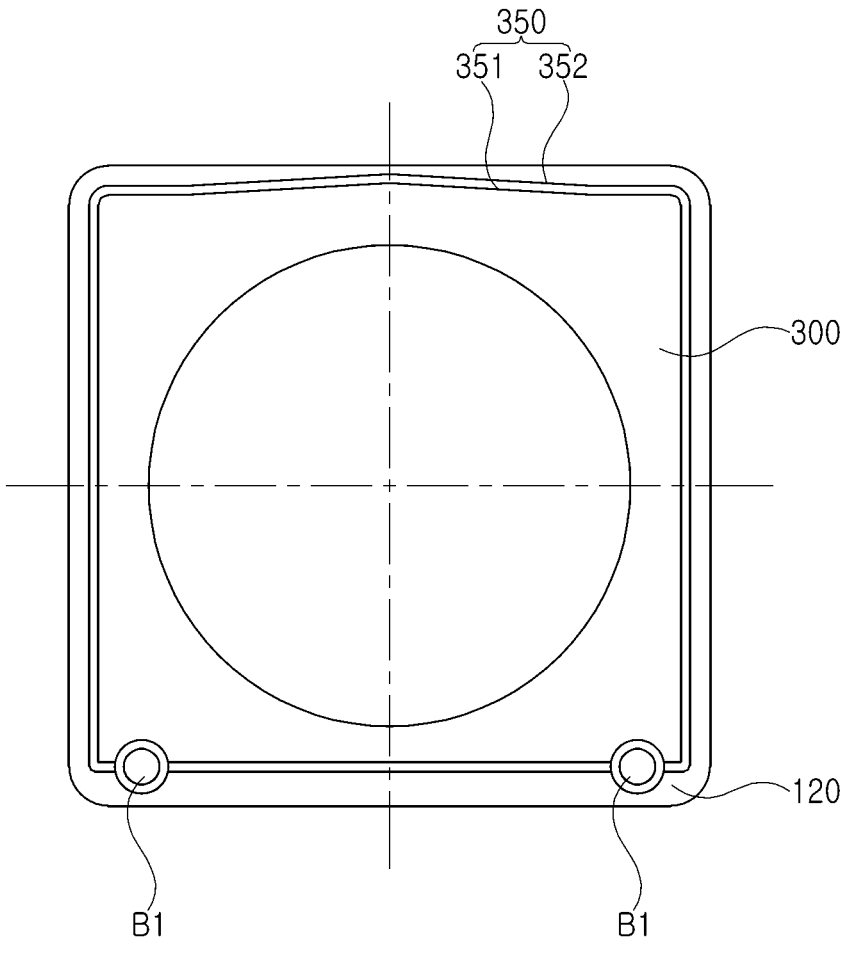
FIG. 7 is a cross-sectional plan view illustrating a coupling shape of a housing and a carrier of a camera module according to one or more example embodiments.

Referring first to FIGS. 3A and 7, in the camera module 1000 according to one or more example embodiments of the present disclosure, the movement reduction portion 350 may be a protrusion 351 and a retracting portion 352 selectively provided on the housing 120 and the carrier 300.

As illustrated in the drawings, the opposite surface of the carrier 300 facing the housing 120 in a direction perpendicular to the optical axis direction may protrude toward the housing 120. The protrusion 351 may be formed as one surface of the carrier 300 is implemented as two inclined surfaces meeting at a corner. In addition, the retracting portion 352 having a shape corresponding to the protrusion 351 may be provided in a portion of the housing 120 facing the protrusion 351 of the carrier 300.

Accordingly, in the case in which the carrier 300 moves inside the housing 120 by external force, the protrusion 351 may be locked while being inserted into the retracting portion 352, and thus the sliding movement caused by surface contact between the carrier 300 and the housing 120 is reduced, and thus the generation of foreign objects may be reduced.

Referring to FIG. 7, in the camera module 1000 according to one or more example embodiments of the present disclosure, the movement reduction portion 350 may be the protrusion 351 and the retracting portion 352 selectively provided on the housing 120 and the carrier 300. The opposite surface of the carrier 300 facing the housing 120 in a direction perpendicular to the optical axis direction may protrude toward the housing 120. The protrusion 351 may be formed as one surface of the carrier 300 is implemented as two inclined surfaces meeting at a corner, and thus, the corner may extend in a direction perpendicular to the optical axis direction. In addition, the retracting portion 352 corresponding to the shape of the protrusion 351 may be provided on one surface of the housing 120 facing the protrusion 351.

Accordingly, even when the housing 120 and the carrier 300 come into contact with each other due to external force or the like, the protrusion 351 of the carrier 300 is inserted into and locked to the retracting portion 352 of the housing 120, and sliding movement is reduced, thereby reducing occurrence of foreign objects due to frictional force.

Figure 8:
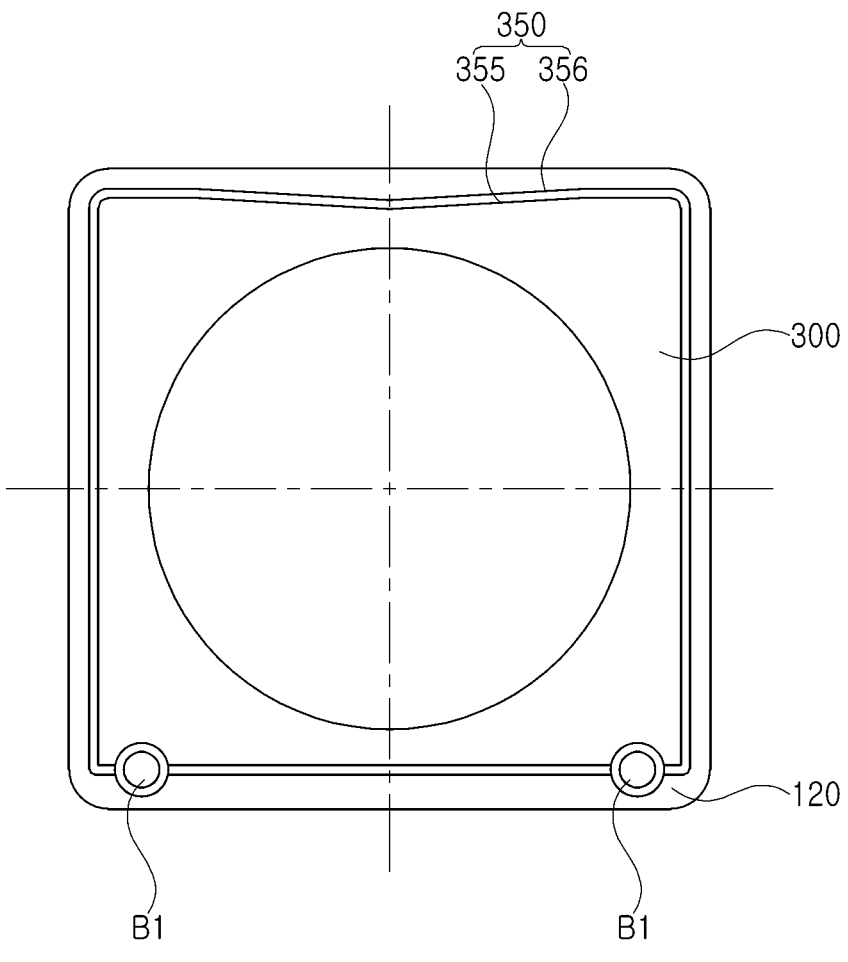
FIG. 8 is a cross-sectional plan view illustrating a coupling shape of a housing and a carrier of a camera module according to one or more example embodiments.

Also, referring to FIG. 8, contrary to the illustration in FIG. 7, a protrusion 356 may protrude from one surface of the housing 120 toward the carrier 300. Thus, the protrusion 356 may be formed as one surface of the housing 120 facing the carrier 300 in a direction perpendicular to the optical axis direction is implemented as two inclined surfaces meeting at a corner, and accordingly, the corner may extend in the direction perpendicular to the optical axis direction. In addition, a retracting portion 355 corresponding to the shape of the protrusion 356 may be provided on one surface of the carrier 300 facing the protrusion 356.

Accordingly, even in a case in which the housing 120 and the carrier 300 come into contact with each other due to external force or the like, the retracting portion 355 of the carrier 300 is fitted and locked to the protrusion 356 of the housing 120 and thus the sliding movement is reduced, thereby reducing occurrence of foreign objects due to frictional force.

Figure 3B:
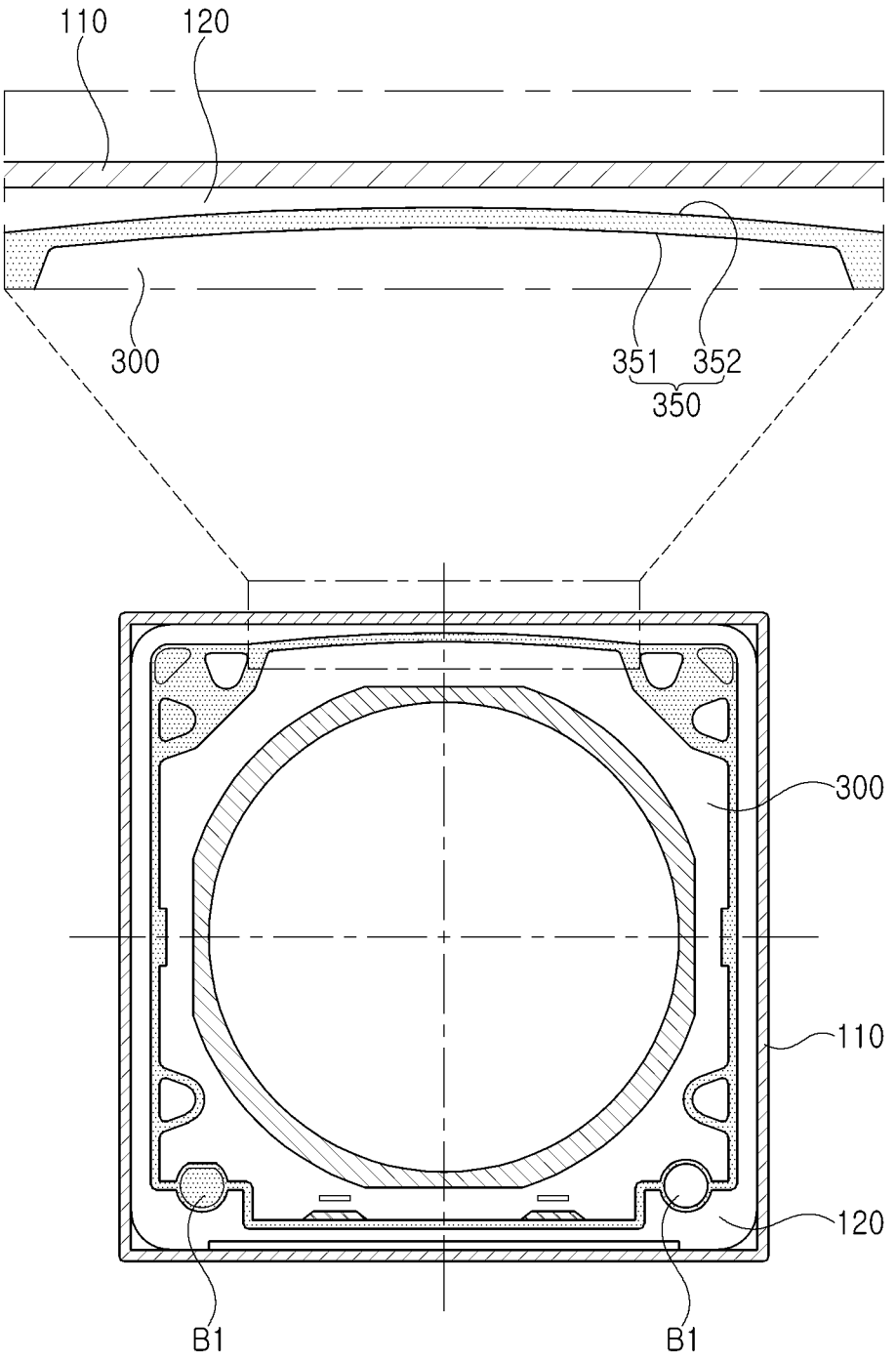

Next, referring to FIG. 3B, in the camera module 1000 according to one or more example embodiments of the present disclosure, the movement reduction portion 350 may be the protrusion 351 and the retracting portion 352 provided on at least one of the housing 120 and the carrier 300, and the protrusion 351 may have a round shape and the retracting portion 352 may have a shape corresponding thereto.

As illustrated in the drawing, the opposite surface of the carrier 300 facing the housing 120 in a direction perpendicular to the optical axis direction may protrude toward the housing 120. The protrusion 351 may be formed as one surface of the carrier 300 protrudes in a round shape. Alternatively, the protrusion 351 may be formed as one surface of the carrier 300 protrudes in a round shape obtained by incising a sphere. Also, the housing 120 may have a retracting portion 352 having a shape corresponding to the shape of the protrusion 351 on a surface thereof opposite to the protrusion 351.

Accordingly, when the carrier 300 moves inside the housing 120 by external force, the protrusion 351 may be fixed (locked) while being inserted into the retracting portion 352, and thus sliding caused by surface contact between the carrier 300 and the housing 120 is reduced, and accordingly, occurrence of foreign substances may be reduced.

In this case, although not illustrated, contrary to FIG. 3B, the protrusion may protrude from one surface of the housing 120 toward the carrier 300, and thus, the carrier 300 may have a retracting portion with a circular shape or a partial shape of a sphere on one surface thereof facing the housing 120 in a direction perpendicular to the optical axis direction.

Figure 4:
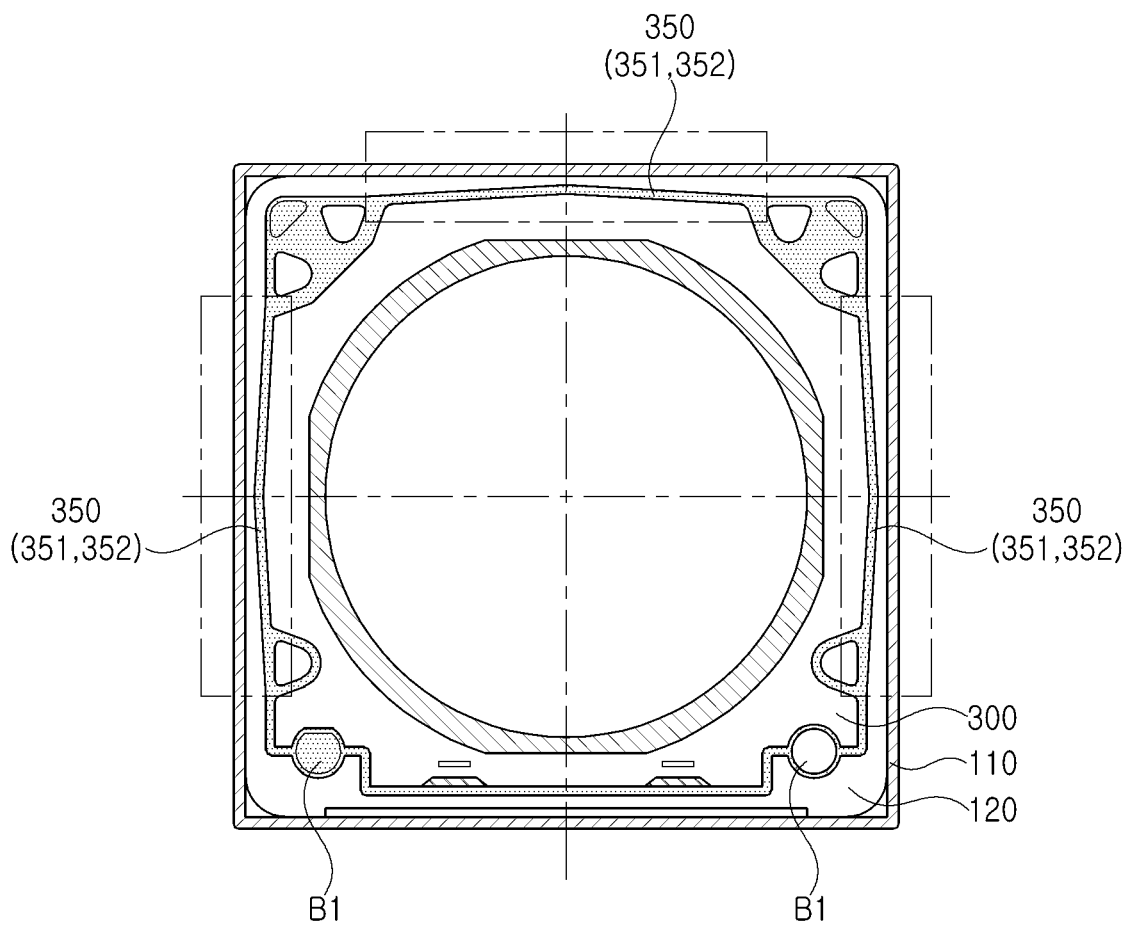
FIG. 4 is a cross-sectional plan view illustrating a coupling shape of a housing and a carrier of a camera module according to one or more example embodiments.

Next, referring to FIG. 4, the housing 120 and the carrier 300 may have substantially quadrangular cross-sections, and the movement reduction portion 350 may be provided on three surfaces other than the opposite surface on which the carrier 300 is supported by the housing 120, and for example, may be provided on one, two, or three surfaces among the three surfaces.

Figure 5:
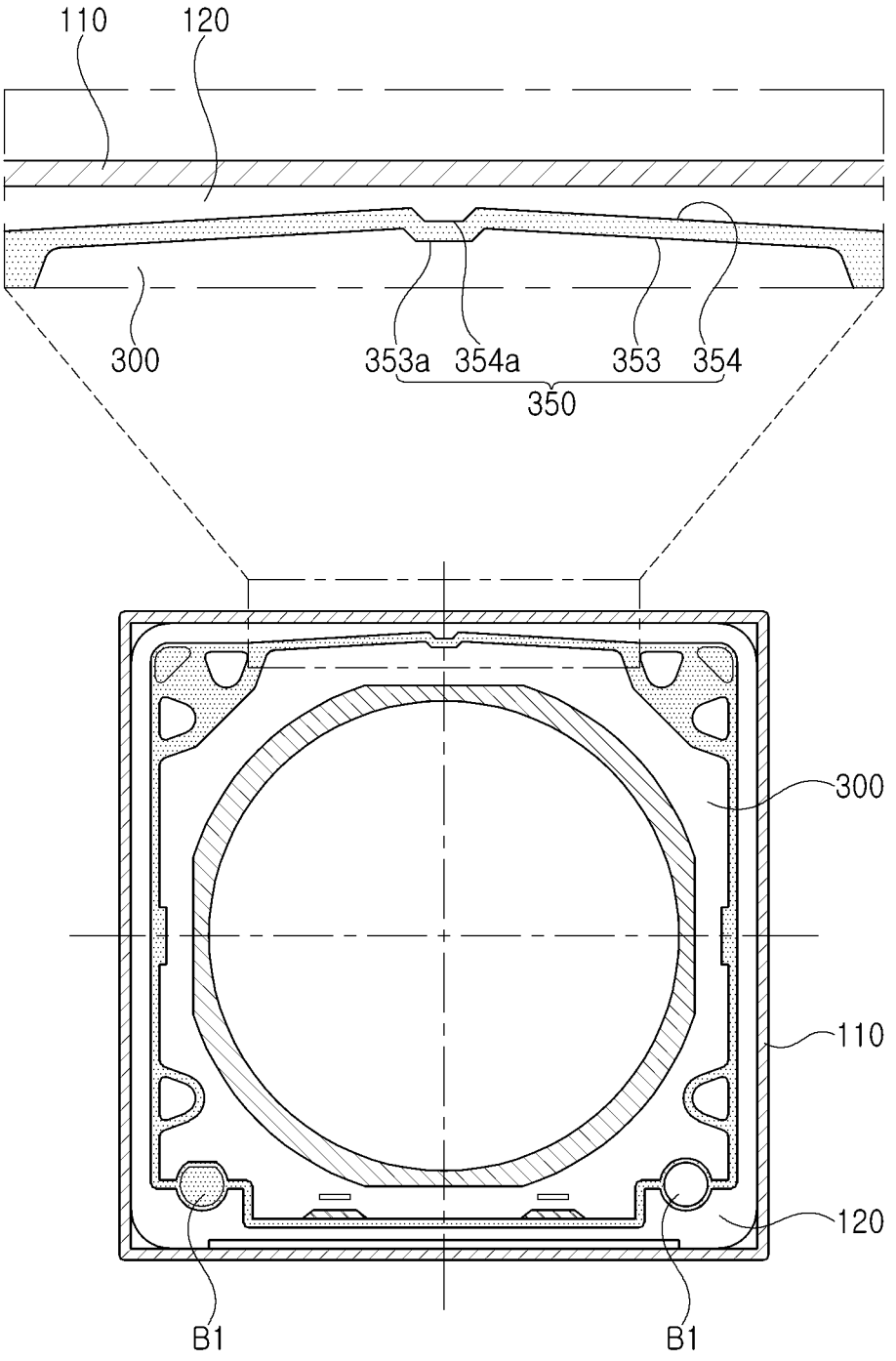
FIG. 5 is a cross-sectional plan view illustrating a coupling shape of a housing and a carrier of a camera module according to one or more example embodiments.

Next, referring to FIG. 5, in the camera module 1000 according to one or more example embodiments of the present disclosure, the movement reduction portion 350 may have a mixed shape (353, 353a, 354, 354a) in which a protrusion and a retracting portion selectively provided in the housing 120 and the carrier 300 are mixed.

As illustrated in the drawing, the opposite surface of the carrier 300 that faces the housing 120 in a direction perpendicular to the optical axis direction has a first protrusion 353 protruding toward the housing 120, and on an uppermost end of the first protrusion 353, a first retracting portion 353a may be provided. The first protrusion 353 may be formed by implementing one surface of the carrier 300 as two inclined surfaces meeting at a corner, and the first retracting portion 353a recessed in an opposite direction thereto may be provided on a portion where the two inclined surfaces meet. Accordingly, two corners may be formed on both sides of the first retracting portion 353a. On a surface of the housing 120 facing the first protrusion 353 and the first retracting portion 353a of the carrier 300, a second retracting portion 354 and a second protrusion 354a having a shape corresponding to the first protrusion 353 and the first retracting portion 353a may be provided.

Accordingly, in a case in which the carrier 300 moves inside the housing 120 by external force, the first protrusion 353 may be fixed (locked) while being inserted into the second retracting portion 354 and the second protrusion 354a may be fixed (locked) while being inserted into the first retracting portion 353a. Accordingly, sliding movement caused by surface contact between the carrier 300 and the housing 120 is reduced, and thus the generation of foreign substances may be reduced. In detail, in the case of one or more example embodiments illustrated in FIG. 5, since two protrusions and two retracting portions are provided, the locking mechanism may be clearer.

On the other hand, although not illustrated, contrary to the illustration in FIG. 5, the first protrusion may protrude from a surface of the housing 120 toward the carrier 300, and accordingly, the first retracting portion may be provided on the surface of the housing 120, and the second protrusion may protrude from the carrier 300 toward the housing 120, and thus the second retracting portion may be provided in the carrier 300.

Figure 6:
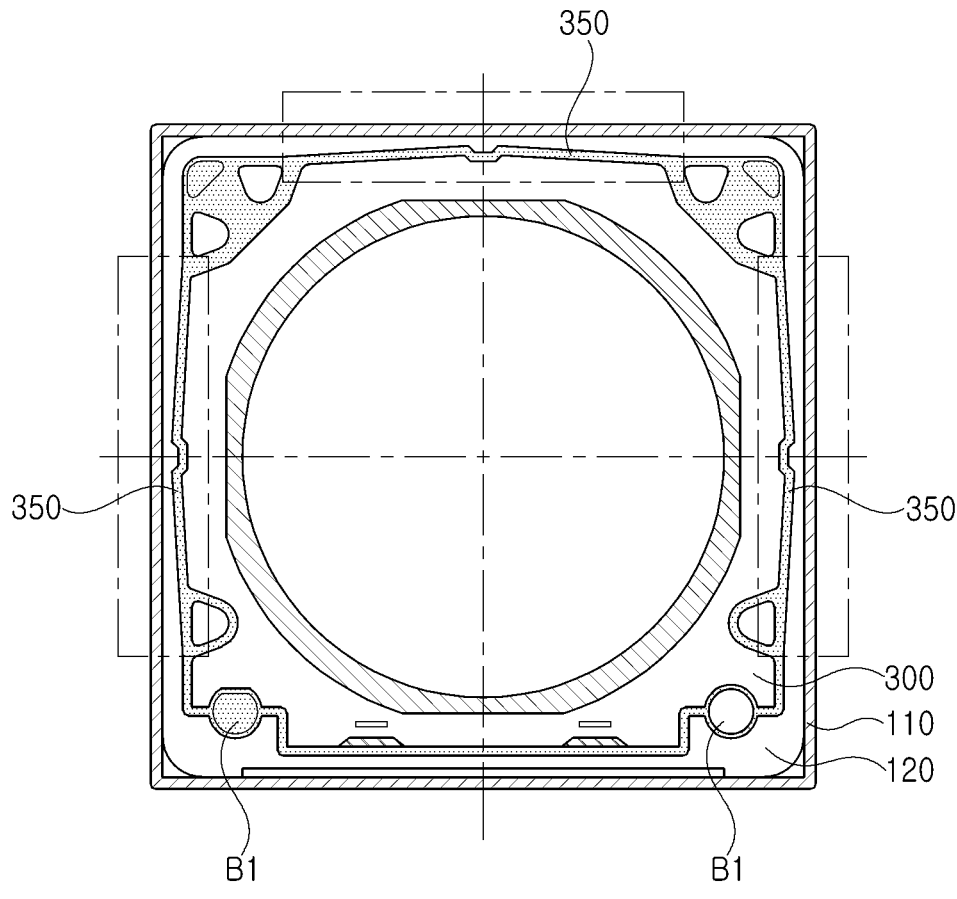
FIG. 6 is a cross-sectional plan view illustrating a coupling shape of a housing and a carrier of a camera module according to one or more example embodiments.

Next, referring to FIG. 6, both the housing 120 and the carrier 300 may have substantially quadrangular cross-sections, and the movement reduction portion 350 may be provided on three surfaces other than the opposite surface on which the carrier 300 is supported by the housing 120, and for example, may be provided on one, two or three of the three surfaces.

Through the above one or more example embodiments as disclosed herein, the camera module according to the one or more example embodiments may secure sufficient strength against external impact while the size thereof is miniaturized.

As set forth above, a camera module according to one or more example embodiments in which generation of foreign objects due to friction may be reduced may be provided.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A camera module comprising:
a housing; and
a carrier supported on the housing with a ball member therebetween, and movable in an optical axis direction,
wherein on opposite surfaces of the housing and the carrier facing each other in a direction perpendicular to the optical axis direction, one surface is provided with either a protrusion or a retracting portion, and the other surface is provided with the remaining one of the protrusion or the retracting portion, wherein the protrusion and the retracting portion have a protrusion shape with a corner, wherein a surface of the carrier on which either the protrusion or the retracting portion is provided has two inclined surfaces respectively disposed on opposite sides of the corner, wherein a surface of the housing facing the surface of the carrier also has two inclined surfaces respectively disposed on opposite sides of the corner, and wherein the two inclined surfaces provided on the carrier and the two inclined surfaces provided on the housing respectively face each other.

2. The camera module of claim 1, wherein the protrusion and the retracting portion have a round shape.

3. The camera module of claim 2, wherein the protrusion and the retracting portion are portions of a sphere.

4. The camera module of claim 1, wherein both the housing and the carrier have substantially quadrangular cross sections, and wherein the movement reduction portion is disposed on all three surfaces other than facing opposite surfaces on which the carrier is supported by the housing.

5. The camera module of claim 1, wherein the protrusion protrudes from the carrier in a direction toward the housing.

6. The camera module of claim 1, wherein the protrusion protrudes from the housing in a direction toward the carrier.

7. The camera module of claim 1, wherein the housing and the carrier comprise a driving coil and a driving magnet, respectively, and wherein the carrier is supported on the housing by attractive force of a pulling yoke disposed in the housing and the driving magnet.

8. The camera module of claim 1, further comprising a frame and a lens holder disposed in the carrier in the optical axis direction and movable in the optical axis direction together with the carrier.

9. The camera module of claim 8, further comprising:

a first ball member disposed between the carrier and the frame; and a second ball member disposed between the frame and the lens holder.

10. The camera module of claim 9, wherein the frame and the lens holder are configured to move together in a first axis direction, perpendicular to the optical axis direction, and wherein the lens holder is configured to move in a second axis direction, perpendicular to the first axis direction, relative to the frame.

11. An electronic device comprising the camera module of claim 1.

12. A camera module comprising:

a housing comprising adjoining walls; and a carrier supported on the housing, and movable in an optical axis direction relative to the housing, wherein one or more walls of the adjoining walls comprises inclined inner surfaces between adjacent walls, inclined relative to a virtual line between where the one or more walls intersect the adjacent walls, wherein the inclined inner surfaces are adjacent to each other, and wherein the carrier comprises one or more surfaces facing the one or more walls, and comprising a shape corresponding to the inclined inner surfaces.

13. The camera module of claim 12, further comprising a ball member disposed between the carrier and the housing.

14. The camera module of claim 12, wherein the one or more walls have one or more of a protrusion shape with a corner and a round shape.

15. The camera module of claim 12, wherein both the housing and the carrier have substantially quadrangular cross sections, and wherein the one or more walls comprises three walls other than a wall of the adjoining walls on which the carrier is supported by the housing.

16. The camera module of claim 12, wherein the inclined inner surfaces protrude from the housing in a direction toward the carrier, or the shape corresponding to the inclined inner surfaces protrudes from the carrier in a direction toward the housing.

17. An electronic device comprising the camera module of claim 12.

* * * * *